US012598455B2

(12) United States Patent
Ke

(10) Patent No.: US 12,598,455 B2
(45) Date of Patent: Apr. 7, 2026

(54) INFORMATION TRANSMISSION METHOD AND APPARATUS, COMMUNICATIONS DEVICE, AND STORAGE MEDIUM

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 478 days.

(21) Appl. No.: 18/110,878

(22) Filed: Feb. 16, 2023

(65) Prior Publication Data

US 2023/0199477 A1     Jun. 22, 2023

Related U.S. Application Data

(63) Continuation of application No. PCT/CN2021/113245, filed on Aug. 18, 2021.

(30) Foreign Application Priority Data

Aug. 18, 2020    (CN) .......................... 202010834155.0

(51) Int. Cl.
*H04W 8/22*     (2009.01)
*H04W 24/08*     (2009.01)

(52) U.S. Cl.
CPC ............. *H04W 8/22* (2013.01); *H04W 24/08* (2013.01)

(58) Field of Classification Search
CPC ......... H04W 8/22; H04W 24/08; H04W 8/24; H04W 28/24; H04W 28/18; H04W 72/51;
(Continued)

(56) References Cited

U.S. PATENT DOCUMENTS

2014/0341041 A1    11/2014    Velev et al.
2017/0317894 A1    11/2017    Dao et al.
(Continued)

FOREIGN PATENT DOCUMENTS

CN        108463805 A      8/2018
CN        109417534 A      3/2019
(Continued)

OTHER PUBLICATIONS

International Search Report and Written Opinion of the International Searching Authority dated Oct. 28, 2021 as received in Application No. PCT/CN2021/113245.
(Continued)

*Primary Examiner* — Shean Tokuta

(74) *Attorney, Agent, or Firm* — Price Heneveld LLP

(57)     ABSTRACT

An information transmission method and apparatus, a communications device, and a storage medium are provided. The method includes: determining whether a terminal supports a first capability; and sending first information and/or a first request, where the first information is used to indicate one of the following: that the terminal supports the first capability; and that the terminal does not support the first capability. The first capability includes at least one of the following: a capability of supporting transmitting second information to an application client of the terminal; a capability of supporting the application client of the terminal to obtain the
(Continued)

second information; a capability of supporting transmitting third information to the application client of the terminal; and a capability of supporting the application client of the terminal to obtain the third information.

20 Claims, 7 Drawing Sheets

(58) Field of Classification Search
CPC ....... H04L 67/10; H04L 67/51; H04L 67/289; H04L 65/80; H04L 69/24
See application file for complete search history.

(56) References Cited

U.S. PATENT DOCUMENTS

| | | | |
|---|---|---|---|
| 2019/0042318 A1 | 2/2019 | Ljung et al. | |
| 2019/0098490 A1 | 3/2019 | Jin et al. | |
| 2019/0306754 A1 | 10/2019 | Shan et al. | |
| 2019/0342373 A1 | 11/2019 | Li et al. | |
| 2020/0084830 A1 | 3/2020 | Liu et al. | |
| 2020/0359218 A1* | 11/2020 | Lee ...................... H04W 12/63 | |
| 2021/0136177 A1* | 5/2021 | Hall ................... H04L 41/5051 | |
| 2021/0226914 A1* | 7/2021 | Shan .................. H04L 61/4552 | |
| 2021/0352156 A1* | 11/2021 | Kim ....................... H04L 67/51 | |
| 2022/0201093 A1* | 6/2022 | Gupta .................... H04L 63/10 | |
| 2022/0321673 A1* | 10/2022 | Zaus .................... H04L 67/562 | |
| 2023/0156094 A1* | 5/2023 | Hergenhan .......... H04L 67/1004 709/227 | |
| 2023/0199477 A1* | 6/2023 | Ke ........................ H04W 24/08 370/329 | |
| 2023/0209621 A1* | 6/2023 | Olvera-Hernandez ...................... H04W 76/12 370/329 | |
| 2023/0276002 A1* | 8/2023 | Xu ........................ H04W 24/08 370/329 | |

FOREIGN PATENT DOCUMENTS

| | | | | |
|---|---|---|---|---|
| EP | 3447645 A1 | 2/2019 | | |
| EP | 3509349 A1 | 7/2019 | | |
| EP | 4181549 A1 * | 5/2023 | ........... H04W 28/24 |
| ID | P202302995 A * | 3/2023 | | |
| JP | 2015511409 A | 4/2015 | | |
| WO | 2017121478 A1 | 7/2017 | | |
| WO | WO-2021060937 A1 * | 4/2021 | ........... H04W 60/00 |
| WO | WO-2021138069 A1 * | 7/2021 | ........... H04W 76/12 |
| WO | WO-2021236861 A1 * | 11/2021 | ........... H04W 76/22 |
| WO | WO-2022026081 A1 * | 2/2022 | ........... H04L 47/805 |
| WO | WO-2022037608 A1 * | 2/2022 | ........... H04L 67/10 |
| WO | WO-2022069121 A1 * | 4/2022 | ........... H04W 8/186 |
| WO | WO-2022171077 A1 * | 8/2022 | ........... H04W 8/26 |
| WO | WO-2024091151 A1 * | 5/2024 | ........... H02J 50/001 |

OTHER PUBLICATIONS

3rd Generation Partnership Project; Technical Specification Group Services and System Aspects; Study on Application Architecture for Enabling Edge Applications; (Release 17); 3GPP TR 23.758 .17.0.0, Dec. 2019.

* cited by examiner

Start

Obtain first information of a terminal and a subscription request of a target terminal for the first information — 501

Send the obtained first information to the target terminal — 502

End

INFORMATION TRANSMISSION METHOD AND APPARATUS, COMMUNICATIONS DEVICE, AND STORAGE MEDIUM

CROSS-REFERENCE TO RELATED APPLICATIONS

This application is a continuation application of International Application No. PCT/CN2021/113245 filed on Aug. 18, 2021, which claims priority to Chinese Patent Application No. 202010834155.0, filed in China on Aug. 18, 2020, which is incorporated herein by reference in its entirety.

TECHNICAL FIELD

This application relates to the field of communications technologies, and in particular, to an information transmission method and apparatus, a communications device, and a storage medium.

BACKGROUND

An edge computing service is introduced to some communications network systems (for example, 5G system). An edge computing server may send related information of an edge computing application layer to a terminal through a communications network. Because the edge computing service is newly introduced, after the network side sends the related information of the edge computing application layer to the terminal, the terminal may be possibly unable to use the information. As a result, network resources for sending the information are wasted because the terminal cannot use such information.

SUMMARY

Embodiments of this application provide an information transmission method and apparatus, a communications device, and a storage medium.

According to a first aspect, an embodiment of this application provides an information transmission method, applied to a first communications device and including:

sending first information and/or a first request, where the first information is used to indicate one of the following:

that a terminal supports a first capability; and that the terminal does not support the first capability.

The first capability includes at least one of the following:

a capability of supporting transmitting second information to an application client of the terminal;

a capability of supporting the application client of the terminal to obtain the second information;

a capability of supporting transmitting third information to the application client of the terminal; and a capability of supporting the application client of the terminal to obtain the third information.

The third information is information obtained by the terminal from control plane signaling of a communications network.

The second information includes at least one of the following:

edge application server (EAS) information;

edge configuration server (ECS) information;

quality of service (QoS) monitoring report or QoS change report; and information used for an application server, where the information used for the application server needs to be forwarded to the application server through the application client.

The first request is used to indicate at least one of the following:

requesting the second information; and requesting information used for the application client.

According to a second aspect, an embodiment of this application provides an information transmission method, applied to a second communications device and including:

performing a second operation, where the second operation includes at least one of the following:

in a case that supporting of a first capability by a terminal is determined and/or a first request is received, sending second information and/or third information; and in a case that non-supporting of the first capability by the terminal is determined and/or the first request is not received, notifying an application server or an application function (AF) that the terminal does not support the first capability.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

QoS monitoring report or QoS change report; and information used for an application server, where the information used for the application server needs to be forwarded to the application server through the application client.

The first request is used to indicate at least one of the following:

requesting the second information; and requesting information used for the application client.

According to a third aspect, an embodiment of this application provides an information transmission method, applied to a third communications device and including:

performing a third operation, where the third operation includes at least one of the following:

in a case that supporting of a first capability by a terminal is determined, sending second information and/or third information to a communications network; and in a case that non-supporting of the first capability by the terminal is determined, sending the second information and/or the third information to the terminal through an application layer.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

According to a fourth aspect, an embodiment of this application provides an information transmission method, applied to a fourth communications device and including:

obtaining first information of a terminal and a subscription request of a target terminal for the first information; and sending the obtained first information to the target terminal.

The first information is used to indicate one of the following:

that the terminal supports a first capability; and that the terminal does not support the first capability.

According to a fifth aspect, an embodiment of this application provides an information transmission apparatus, applied to a first communications device and including:

a sending module, configured to send first information and/or a first request, where the first information is used to indicate one of the following:

that a terminal supports a first capability; and that the terminal does not support the first capability.

The first capability includes at least one of the following:

a capability of supporting transmitting second information to an application client of the terminal;

a capability of supporting the application client of the terminal to obtain the second information;

a capability of supporting transmitting third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

According to a sixth aspect, an embodiment of this application provides an information transmission apparatus, applied to a second communications device and including:

an execution module, configured to perform a second operation, where the second operation includes at least one of the following:

in a case that supporting of a first capability by a terminal is determined and/or a first request is received, sending second information and/or third information;

in a case that non-supporting of the first capability by the terminal is determined and/or the first request is not received, notifying an application server or an AF that the terminal does not support the first capability; and in a case that non-supporting of the first capability by the terminal is determined and/or the first request is not received, sending, to the application server or the AF, information used for the application server.

The first capability includes at least one of the following:

a capability of supporting transmitting second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

According to a seventh aspect, an embodiment of this application provides an information transmission apparatus, applied to a third communications device and including:

an execution module, configured to perform a third operation, where the third operation includes at least one of the following:

in a case that supporting of a first capability by a terminal is determined, sending second information and/or third information to a communications network; and in a case that non-supporting of the first capability by the terminal is determined, sending the second information and/or the third information to the terminal through an application layer.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

According to an eighth aspect, an embodiment of this application provides an information transmission apparatus, applied to a fourth communications device and including:

an obtaining module, configured to obtain first information of a terminal and a subscription request of a target terminal for the first information; and a sending module, configured to send the obtained first information to the target terminal.

The first information is used to indicate one of the following:

that the terminal supports a first capability; and that the terminal does not support the first capability.

According to a ninth aspect, an embodiment of this application provides a communications device, including a memory, a processor, and a program or instructions stored in the memory and capable of running on the processor, where when the program or the instructions are executed by the processor, the steps of the information transmission method on the first communications device side are implemented, or when the program or instructions are executed by the processor, the steps of the information transmission method on the second communications device side are implemented, or when the program or instructions are executed by the processor, the steps of the information transmission method on the third communications device side are implemented, or when the program or instructions are executed by the processor, the steps of the information transmission method on the fourth communications device side are implemented.

According to a tenth aspect, an embodiment of this application provides a readable storage medium, where a program or instructions are stored in the readable storage medium. When the program or the instructions are executed by a processor, the steps of the information transmission method on the first communications device side are implemented, or when the program or instructions are executed by a processor, the steps of the information transmission method on the second communications device side are implemented, or when the program or instructions are executed by a processor, the steps of the information transmission method on the third communications device side are implemented, or when the program or instructions are executed by a processor, the steps of the information transmission method on the fourth communications device side are implemented.

In the embodiments of this application, whether the terminal supports the first capability is determined; and the first information and/or the first request is sent, where first information is used to indicate one of the following: that the terminal supports the first capability; and that the terminal does not support the first capability. The first capability includes at least one of the following: a capability of supporting transmitting the second information to an application client of the terminal; a capability of supporting the application client of the terminal to obtain the second information; a capability of supporting transmitting the third information to the application client of the terminal; and a capability of supporting the application client of the terminal to obtain the third information. The third information is information obtained by the terminal from control plane signaling of a communications network. The second information includes at least one of the following: edge application server EAS information; edge configuration server ECS information; quality of service QoS monitoring report or QoS change report; and information used for an application server, where the information used for the application server needs to be forwarded to the application server through the application client. The first request is used to indicate at least one of the following: requesting the second information; and requesting information used for the application client. In this way, the first information can be reported to the network side, so as to prevent the network side from sending at least one of the second information and/or the third information to the terminal in the case that the terminal does not support the first capability, thereby achieving effects of saving network resources.

BRIEF DESCRIPTION OF DRAWINGS

Other advantages and benefits will become apparent to persons of ordinary skill in the art by reading detailed description of the exemplary embodiments below. The accompanying drawings are merely intended to illustrate the purposes of the preferred implementations, and should not be construed as a limitation on this application. Throughout the accompanying drawings, the same reference numerals represent the same components. In the accompanying drawings.

DETAILED DESCRIPTION OF EMBODIMENTS

Figure 1:
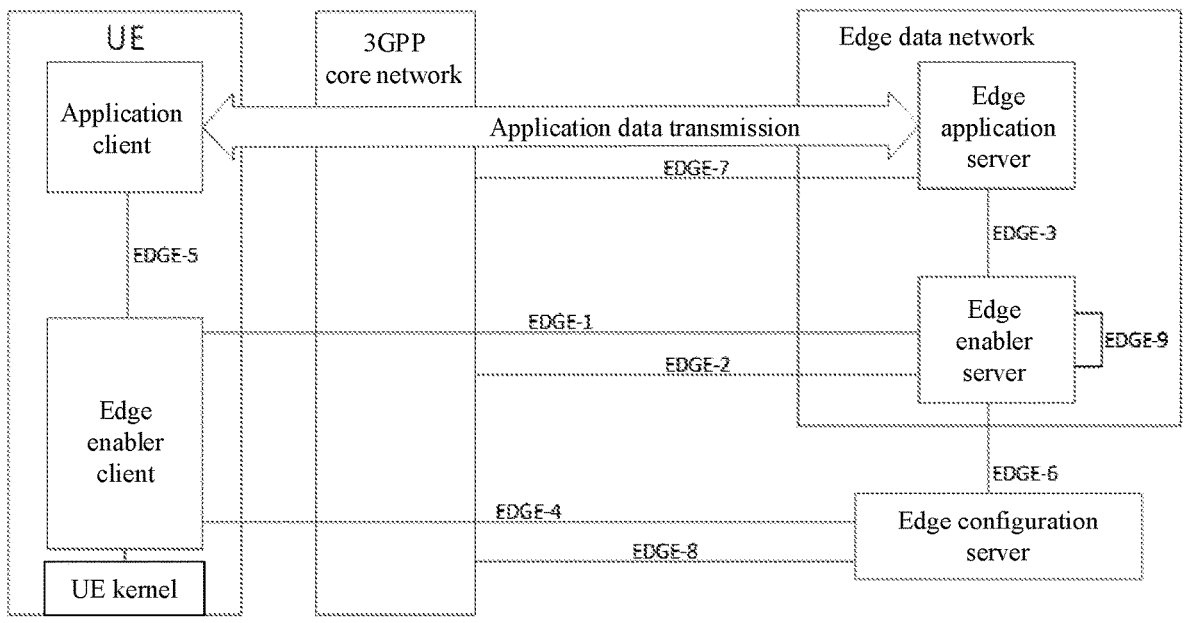
FIG. 1 is a schematic architectural diagram of a wireless communications system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, the use of "and/or" represents presence of at least one of the connected objects, for example, "A and/or B" indicates the following three cases: A alone, B alone, or both A and B.

In the embodiments of this application, the terms "an example" or "for example" are used to represent an example, an illustration, or a description. Any embodiment or design scheme described as "an example" or "for example" in the embodiments of this application should not be construed as being more preferred or advantageous than other embodiments or design schemes. To be precise, the words such as "an example" or "for example" are intended to present a related concept in a specific manner.

The following describes the embodiments of this application with reference to the accompanying drawings. It should be noted that an information transmission method and apparatus, a communications device, and a storage medium provided in the embodiments of this application are not limited to a long term evolution (LTE)/LTE-advanced LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

For better understanding the embodiments of this application, the following technical points are first described.

Installation files of some application clients may be developed based on standard interfaces of an operating system (such as a framework of the operating system SDK), and may be applied to terminals of different brands, without being bound by terminal capabilities. Before being sent to an application client, information obtained by a communications module of the terminal from control plane signaling of a communications network needs to pass through the operating system of the terminal and obtain support $^{of}$ the operating system, for example, an interface between the operating system and the application client. However, due to a newly introduced edge computing service in the communications system, related information of an edge computing application layer (for example, EAS information, ECS information, and QoS monitoring report of edge service) is not information whose transmission to the application client can be supported by the existing operating system. Therefore, in order to support transmission of related information of the edge data network, additional terminal capabilities are required.

Question 1: EASs and ECSs are servers for edge computing services deployed by operators. Except for the operators' customized terminals, other terminals may have no enhanced operating system capabilities to transmit related information to related application clients. As a result, application clients of mobile edge computing (MEC) or application clients installed on some terminals cannot work.

One solution is that: terminals provide, to the network (for example, an AMF), whether a first capability is supported. Only for terminals having the first capability, the network sends, to the terminals, information to be sent to application clients; and for terminals that do not have the first capability, the network may notify an application layer server, and the application layer server sends second information to the terminals through an application layer.

In addition, the application layer server may subscribe to terminal capabilities from the network. When the terminal has the first capability, the application layer server may send the second information to the network; and when the terminal does not have the first capability, the application layer server may send the second information to the terminal through the application layer.

The first capability includes at least one of the following:
a capability of supporting transmitting the second information to an application client of the terminal;
a capability of supporting the application client of the terminal to obtain the second information;
a capability of supporting transmitting third information to the application client of the terminal; and
a capability of supporting the application client of the terminal to obtain the third information.

The third information is information obtained by the terminal from the control plane signaling of the communications network.

Only after supporting of the first capability by the terminal or a request from the terminal is received, the network sends, to the terminal, the second information and/or third information, for example, EAS address, ECS address, QoS monitoring report or QoS change report, and information used for the application server. The information used for the application server needs to be forwarded to the application server through the application client.

In addition, the ECS or EAS may subscribe to a terminal capability, for example, the first capability.

Another solution is: An application client (for example, an edge enabler client Edge Enabler Client, EEC) is integrated in the communications module (for example, a chip). In this case, the terminal sends, to the network (for example, an AMF), presence of the first capability on the terminal or a location of the EEC. The network sends the second information and/or the third information only after determining a location of the application client. The second information is, for example, EAS address, ECS address, or QoS monitoring information.

Question 2: information such as QoS monitoring report generated by the communications network needs to be reported to the server; however, this requires changes in interior of the communications network and interfaces between the communications network and the server. In an implementation, the QoS monitoring report is sent to the terminal, the terminal transmits the report to the application client, and then the application client sends the report to the server through the application layer. However, the QoS monitoring report is not information whose transmission to the application client can be supported by the existing operating system. Therefore, for supporting transmission of the QoS monitoring report, additional terminal capabilities are required.

The following describes the embodiments of this application with reference to the accompanying drawings. An information transmission method and apparatus, a communications device, and a storage medium provided in the embodiments of this application may be applied to a network system shown in FIG. 1. The network system shown in FIG. 1 includes: a terminal, a 3GPP core network, and an edge data network.

In an optional embodiment of this application, an application client may include at least one of the following: an edge enabler client (EEC) and an edge application client (EAC).

In an optional embodiment of this application, an application server may include at least one of the following: an edge enabler server (EES) and an edge application server (EAS).

In an optional embodiment of this application, address information of the EAS may include IP address information of the EAS.

In an optional embodiment of this application, address information of an ECS may include IP address information of the ECS.

In an optional embodiment of this application, domain name information of the EAS may include a fully qualified domain name (FQDN) of the EAS.

In an optional embodiment of this application, domain name information of the ECS may include an FQDN of the ECS.

In an optional embodiment of this application, the communications device may include at least one of the following: a communications network element device and a terminal.

In an embodiment of this application, the communications network element may include at least one of the following: a core-network network element and a radio-access-network network element.

In the embodiments of this application, the core-network network element may include but is not limited to at least one of the following: a core network device, a core network node, a core network function, a core-network network element, a mobility management entity (MME), an access and mobility management function (AMF), a session management function (SMF), a user plane function (UPF), a serving gateway (serving GW, SGW), a PDN gateway (PDN-GW), a policy control function (PCF), a policy and charging rules function unit (PCRF), a GPRS serving support node (SGSN), a gateway GPRS support node (GGSN), a unified data management (UDM), a unified data repository (UDR), a home subscriber server (HSS), an application function (AF), and a centralized network configuration (CNC).

In the embodiments of this application, the radio-access-network network element may include but is not limited to at least one of the following: a radio access network device, a radio access network node, a radio access network function, a radio access network unit, a third generation partnership project (Third Generation Partnership Project, 3GPP) radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (N3IWF), an access controller (AC) node, an access point (AP) device, a wireless local area network (WLAN) node, or an N3IWF.

The base station may be a base transceiver station (BTS) in a global system for mobile communications (GSM) or code division multiple access (CDMA) network, may be a base station (NodeB) in wideband code division multiple access (WCDMA), or may be an evolved NodeB (eNB or eNodeB, evolved NodeB) in LTE, or a 5G NodeB (gNB). This is not limited in the embodiments of this application.

In the embodiments of this application, the UE is a terminal. The terminal may include a relay supporting terminal functions and/or a terminal supporting relay functions. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of this application.

In the embodiments of this application, one or more application clients and an edge enabler client may be installed in the terminal.

In the embodiments of this application, the edge data network may include one or more edge application servers and one or more edge enabler servers.

In an optional embodiment of this application, as shown in FIG. 1, an edge computing service application server (such as an Edge Configuration Server) interacts with an edge computing application client on the terminal through a communications network. As shown in FIG. 1, EDGE1, EDGE2, EDGE3, EDGE4, EDGE5, EDGE6, EDGE7, and EDGE8 represent different interfaces.

In addition, the embodiments of this application may be also applied to communications systems such as 4G and 6G.

In an optional embodiment of this application, a first capability is a capability of the operating system of the terminal, and may include at least one of the following:

a capability of the operating system of the terminal supports transmitting second information to the application client of the terminal;

a capability of the operating system of the terminal supports the application client of the terminal to obtain the second information;

the capability of the operating system of the terminal supports transmitting the third information to the application client of the terminal; and the capability of the operating system of the terminal supports the application client of the terminal to obtain the third information.

The third information is information obtained by the terminal from control plane signaling of the communications network.

In an optional embodiment of this application, capabilities of the operating system of the terminal include at least one of the following: capabilities of the framework of the operating system of the terminal, and capabilities of the kernel of the operating system of the terminal.

(1) The capability of the framework of the operating system of the terminal may include at least one of the following:

the capability of the framework of the operating system of the terminal supports transmitting the second information to the application client of the terminal;

the capability of the framework of the operating system of the terminal supports the application client of the terminal to obtain the second information;

the capability of the framework of the operating system of the terminal supports transmitting the third information to the application client of the terminal; and the capability of the framework of the operating system of the terminal supports the application client of the terminal to obtain the third information.

The third information is information obtained by the terminal from the control plane signaling of the communications network.

(2) The capability of the kernel of the operating system of the terminal may include at least one of the following:

the capability of the kernel of the operating system of the terminal supports transmitting the second information to the application client of the terminal;

the capability of the kernel of the operating system of the terminal supports the application client of the terminal to obtain the second information;

the capability of the kernel of the operating system of the terminal supports transmitting the third information to the application client of the terminal; and the capability of the kernel of the operating system of the terminal supports the application client of the terminal to obtain the third information.

The third information is information obtained by the terminal from the control plane signaling of the communications network.

In an optional embodiment of this application, the information obtained by the terminal from the control plane signaling of the communications network includes: information obtained by a communications module of the terminal from the control plane signaling of the communications network. In an optional embodiment of this application, the communications module may include a chip used for communicating with the network. The control plane signaling includes at least one of the following: NAS signaling and AS stratum signaling (also referred to as RRC signaling).

In an optional embodiment of this application, the information used for the application client may include at least one of the following: information required by the application client (for example, information required for operation of the application client, such as EAS information or ECS information) and information sent by the application client to the application server, where the information (for example, a QoS monitoring report or a QoS change report) is sent at the application layer. The QoS is QoS provided by the communications network. It is easy to understand that the information sent by the application client to the application server at the application layer is embodied as application data, not requiring additional terminal capabilities or network capabilities.

In an implementation, the information obtained by the terminal from the control plane signaling of the communications network may be information obtained by the communications network from an AF. The information may be data generated by the application server for the application client. It is easy to understand that the application server generates information required by the application client, and sends the information to the communications network through the AF; then the communications network sends the information to the terminal by using control plane signaling, and the terminal sends the information to the application client on the terminal.

In another implementation, the information obtained by the terminal from the control plane signaling of the communications network may be information generated by the communications network. The information needs to be sent by the application client to the application server through the application layer. It is easy to understand that the information sent through the application layer may be packaged into user plane data in the communications network, thereby reducing impact on a control plane interface.

In an optional embodiment of this application, the second information and/or the third information may be obtained by the terminal from the control plane signaling of the communications network. For example, the second information and/or the third information are received and obtained by the terminal from NAS signaling and/or access stratum (AS) signaling sent by the communications network. That is, the communications network adds the second information and/or the third information to the NAS signaling and/or the AS signaling and sends it to the terminal.

In an optional embodiment of this application, sending the second information and/or the third information to the terminal through the application layer includes sending the second information and/or the third information to the terminal by using application layer signaling and/or data. It is easy to understand that when the second information and/or the third information is sent to the terminal through the application layer, the second information and/or the third information is embodied as application data, which can be sent to the client of the terminal without changing the terminal capability.

In an optional embodiment of this application, the information used for the application server includes but is not limited to: a QoS monitoring report or a QoS change report.

In the embodiments of this application, obtaining may be understood as generating, acquiring from configuration, receiving, obtaining through receiving upon a request, obtaining through self-learning, obtaining through deduction based on non-received information, or obtaining through processing received information, which may be determined according to actual needs. This is not limited in the embodiments of this application.

Optionally, transmitting may include broadcasting, broadcasting through a system message, returning a response after receiving the request, and sending by using dedicated signaling.

In an optional embodiment of this application, the first information may be sent to the network by using a radio resource control (RRC) message or a non-access stratum NAS message.

In an optional embodiment of this application, the second information and/or the third information may be received via an RRC message or a NAS message.

The method and the communications device provided in the embodiments of this application may be applied to a wireless communications system. The wireless communications system may be a fifth-generation (5G) mobile communications system, an evolved packet system (EPS), or a later evolved communications system. The wireless communications network in the embodiments of this application may be a fifth generation mobile communications network (Fifth-generation system, 5GS) or an LTE network.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

Figure 2:
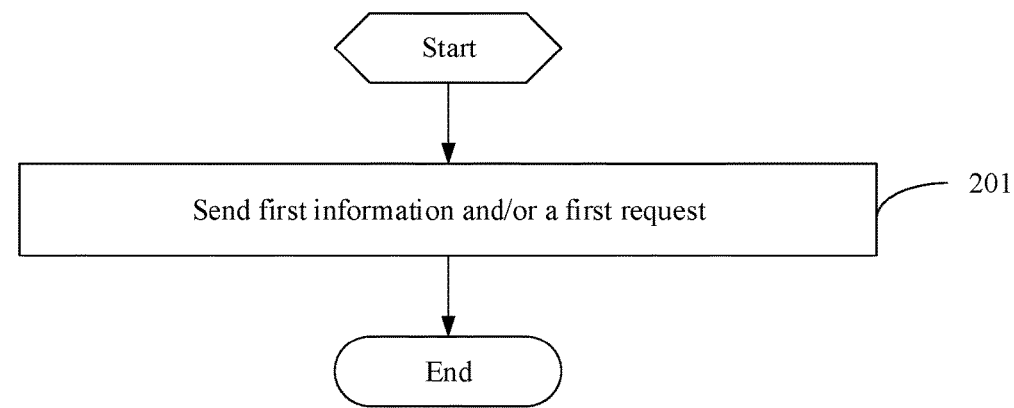
FIG. 2 is a flowchart of an information transmission method according to an embodiment of this application.

Referring to FIG. 2, an embodiment of this application provides an information transmission method, applied to a first communications device. In an implementation, the first communications device includes a terminal (UE). In another implementation, the first communications device includes but is not limited to: a CN network element (such as an AMF or AF). The method includes the following step.

Step 201: Send first information and/or a first request, where the first information is used to indicate one of the following:

that the terminal supports a first capability; and that the terminal does not support the first capability.

The first capability includes at least one of the following:

a capability of supporting transmitting second information to an application client of the terminal;

a capability of supporting the application client of the terminal to obtain the second information;

a capability of supporting transmitting third information to the application client of the terminal; and a capability of supporting the application client of the terminal to obtain the third information.

The third information is information obtained by the terminal from control plane signaling of a communications network.

The second information includes at least one of the following:

EAS information;

ECS information;

QoS monitoring report or QoS change report; and information used for an application server, where the information used for the application server needs to be forwarded to the application server through the application client.

The first request is used to indicate at least one of the following:

requesting the second information; and requesting information used for the application client.

In an implementation, the second information is received from the control plane signaling of the communications network.

In an implementation, before sending first information and/or a first request, the terminal may determine whether the first capability is supported. Certainly, the first information may be pre-configured.

In an implementation, the first capability may also be referred to as a capability of supporting an enhanced kernel.

In an implementation, the capability of supporting transmitting the second information to the application client of the terminal may be that the terminal proactively transmits the second information to the application client.

In an implementation, the capability of supporting the application client of the terminal to obtain the second information may be that the application client proactively obtains the second information.

In an implementation, the application client may be any one or more clients installed in the terminal.

In an implementation, sending the first information may be sending the first information to the network, for example, sending the first information to a core network network element (such as an AMF) or a RAN network element.

In an implementation, the capability of supporting transmitting the third information to the application client of the terminal may be to support proactively sending to the application client the third information obtained from the communications network, so that the application client may use the third information. In another implementation, the capability of supporting the application client of the terminal to obtain the third information may be supporting the application client to proactively obtain the third information that is obtained from the communications network.

In an optional embodiment of this application, the information used for the application client may include at least one of the following: information required by the application client (for example, information required for operation of the application client, such as EAS information or ECS information) and information sent by the application client to the application server, where the information (for example, a QoS monitoring report or a QoS change report) is sent at the application layer. The QoS is QoS provided by the communications network.

In an implementation, the information obtained by the terminal from the control plane signaling of the communications network may be information obtained by the communications network from an AF. The information may be data generated by the application server for the application client. It is easy to understand that the application server generates information required by the application client, and sends the information to the communications network through the AF; then the communications network sends the information to the terminal by using control plane signaling, and the terminal sends the information to the application client on the terminal.

In another implementation, the information obtained by the terminal from the control plane signaling of the communications network may be information generated by the communications network. The information needs to be sent by the application client to the application server through the application layer. It is easy to understand that the information sent through the application layer may be packaged into user plane data in the communications network, thereby reducing impact on a control plane interface.

In an implementation, the requesting information used for the application client may be requesting the communications network to send, to the terminal, the information used for the application client of the terminal.

In an implementation, the information used for the application server needing to be forwarded to the application server through the application client may be requesting the communications network to send, to the terminal, the information used for the application server, where the information used for the application server needs to be forwarded to the application server through the application client.

In this embodiment of this application, the first information is reported to the network side, so as to prevent the network side from sending at least one of the EAS information and the ECS information to the terminal in a case that the terminal does not support the first capability, that is, the network side sends the second information and/or the third information to the terminal only in the case that the terminal supports the first capability, thereby achieving effects of saving network resources.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

(1) Optionally, after the step of sending the first information and/or the first request, the method further includes:

receiving the second information and/or the third information.

After receiving the second information and/or the third information, the terminal sends the second information and/or the third information to the application client of the terminal in the case that the terminal supports the first capability.

In an implementation, receiving the second information and/or the third information may be receiving the second information and/or the third information from the communications network, for example, receiving the second information and/or the third information sent by the CN network element.

(2) Optionally, after the step of sending the first information and/or the first request, the method further includes:

in a case that the terminal supports the first capability, performing a first operation, where the first operation includes at least one of the following:

receiving the second information and/or the third information; and sending the second information and/or the third information to the application client of the terminal.

In an implementation, the network side sends the second information and/or the third information to the terminal only in the case that supporting of the first capability by the terminal is determined, and the terminal receives the second information and/or the third information only in the case that the terminal supports the first capability.

Optionally, the EAS information includes at least one of the following: address information of an EAS and domain name information of the EAS; and the ECS information includes at least one of the following: address information of an ECS and domain name information of the ECS.

In an implementation, the address information of the EAS may include IP address information of the EAS, and the address information of the ECS may include IP address information of the ECS.

Optionally, the sending a first request includes: in a case that a first condition is satisfied, sending the first request.

The first condition includes at least one of the following:

the terminal has the first capability; and the application is authorized to obtain the second information and/or the third information.

In an implementation, the first request is sent only in a case that the first condition is satisfied, so as to further save network resources.

In this embodiment of this application, the first information and/or the first request is sent, where the first information is used to indicate one of the following: that the terminal supports the first capability; and that the terminal does not support the first capability. The first capability includes at least one of the following: a capability of supporting transmitting the second information to an application client of the terminal; a capability of supporting the application client of the terminal to obtain the second information; a capability of supporting transmitting the third information to the application client of the terminal; and a capability of supporting the application client of the terminal to obtain the third information. The third information is information obtained by the terminal from control plane signaling of a communications network. The second information includes at least one of the following: edge application server EAS information; edge configuration server ECS information; quality of service QoS monitoring report or QoS change report; and information used for an application server, where the information used for the application server needs to be forwarded to the application server through the application client. The first request is used to indicate at least one of the following:

requesting the second information; and requesting information used for the application client. In this way, the first information can be reported to the network side, so as to prevent the network side from sending at least one of the second information and/or the third information to the terminal in the case that the terminal does not support the first capability, thereby achieving effects of saving network resources.

Figure 3:
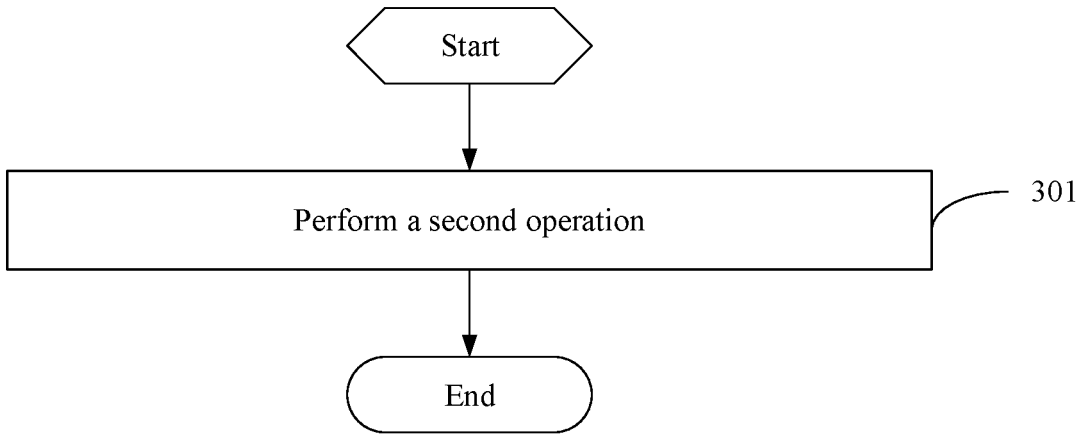
FIG. 3 is a flowchart of another information transmission method according to an embodiment of this application.

Referring to FIG. 3, an embodiment of this application provides another information transmission method, applied to a second communications device. In an implementation, the second communications device includes a CN network element (such as an AMF or AF), and in another implementation, the second communications device includes but is not limited to one of the following: EAS and ECS. The method includes the following step.

301: Perform a second operation, where the second operation includes at least one of the following:

in a case that supporting of a first capability by a terminal is determined and/or a first request is received, sending second information and/or third information;

in a case that non-supporting of the first capability by the terminal is determined and/or the first request is not received, notifying an application server or an application function AF that the terminal does not support the first capability; and in a case that non-supporting of the first capability by the terminal is determined and/or the first request is not received, sending, to the application server or the AF, information used for the application server.

In an implementation, the step of sending the second information and/or the third information in the case that supporting of the first capability by the terminal is determined and/or the first request is received includes: sending the second information and/or the third information to the terminal in the case that supporting of the first capability by the terminal is determined and/or the first request is received.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

In an implementation, for the first capability, the second information, and the third information, reference may be made to the corresponding description of the embodiment shown in FIG. 2; and details are not repeated herein again.

In an implementation, the determining that the terminal supports the first capability may be performing determining based on the first information reported by the terminal.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, after the step of performing the second operation, the method further includes:

receiving first information, where the first information is used to indicate one of the following:

that the terminal supports the first capability; and that the terminal does not support the first capability.

In an implementation, for the first information, reference may be made to the corresponding descriptions of the embodiment shown in FIG. 2; and details are not repeated herein.

Optionally, the method includes:

determining, according to the first information, whether the terminal supports the first capability.

Optionally, the EAS information includes at least one of the following: address information of an EAS and domain name information of the EAS; and the ECS information includes at least one of the following: address information of an ECS and domain name information of the ECS.

In an implementation, for the EAS information and ECS information, reference may be made to the corresponding descriptions of the embodiment shown in FIG. 2; and details are not repeated herein.

In an implementation, the information used for the application server includes but is not limited to: a QoS monitoring report or a QoS change report. It is easy to understand that the information used for the application server is sent to the terminal in the case that supporting of the first capability by the terminal is determined and/or the first request is received; and upon reception, the terminal sends the information to the application client, and the application client forwards the information to the application server.

The information used for the application server is sent to the AF in the case that non-supporting of the first capability by the terminal is determined and/or the first request is not received; and upon reception, the AF sends, to the application server, the information used for the application server.

In this embodiment, the second information and/or the third information is sent in the case that supporting of the first capability by the terminal is determined, thereby saving network resources.

Figure 4:
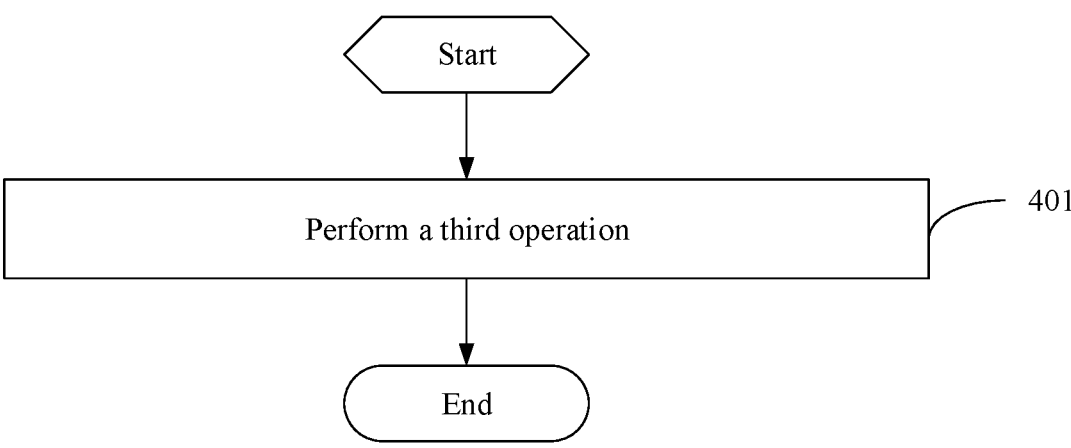
FIG. 4 is a flowchart of another information transmission method according to an embodiment of this application.

Referring to FIG. 4, an embodiment of this application provides another information transmission method, applied to a third communications device. In an implementation, the third communications device includes an EAS, an ECS, and an application layer server, and in another implementation, the third communications device includes but is not limited to one of the following: a CN network element (such as an AMF or AF). The method includes the following step.

Step 401: Perform a third operation, where the third operation includes at least one of the following:

in a case that supporting of a first capability by a terminal is determined, sending second information and/or third information to a communications network; and in a case that non-supporting of the first capability by the terminal is determined, sending the second information and/or the third information to the terminal through an application layer.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

In an implementation, for the first capability, the second information, and the third information, reference may be made to the corresponding descriptions of the embodiments shown in FIG. 2 and FIG. 3.

In an implementation, the second information and/or the third information is sent to the communications network in the case that supporting of the first capability by the terminal is determined, thereby saving network resources.

In an implementation, sending the second information and/or the third information to the terminal through the application layer includes sending the second information and/or the third information to the terminal by using application layer signaling and/or data. It is easy to understand that when the second information and/or the third information is sent to the terminal through the application layer, the second information and/or the third information is embodied as application data, which can be sent to the client of the terminal without changing the terminal capability.

In an implementation, the second information and/or the third information is sent to the terminal through the application layer in the case that non-supporting of the first capability by the terminal is determined. In this way, the second information and/or the third information is sent through the communications network in the case that the terminal does not support the first capability, thereby saving network resources.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, after the step of performing the third operation, the method further includes:

subscribing to first information of the terminal from the communications network, where the first information is used to indicate one of the following:

that the terminal supports the first capability; and that the terminal does not support the first capability.

In an implementation, the subscribing to first information of the terminal from the communications network may be obtaining the first information from subscription information sent by the communications network, so as to determine whether the terminal supports the first capability.

Optionally, the method further includes:

determining, according to the first information, whether the terminal supports the first capability.

In this embodiment of this application, the second information and/or the third information is sent to the communications network in the case that supporting of the first capability by the terminal is determined, thereby saving network resources. The second information and/or the third information is sent to the terminal by using application layer signaling in the case that non-supporting of the first capability by the terminal is determined. In this way, the second information and/or the third information is sent through the communications network in the case that the terminal does not support the first capability, thereby saving network resources.

Figure 5:
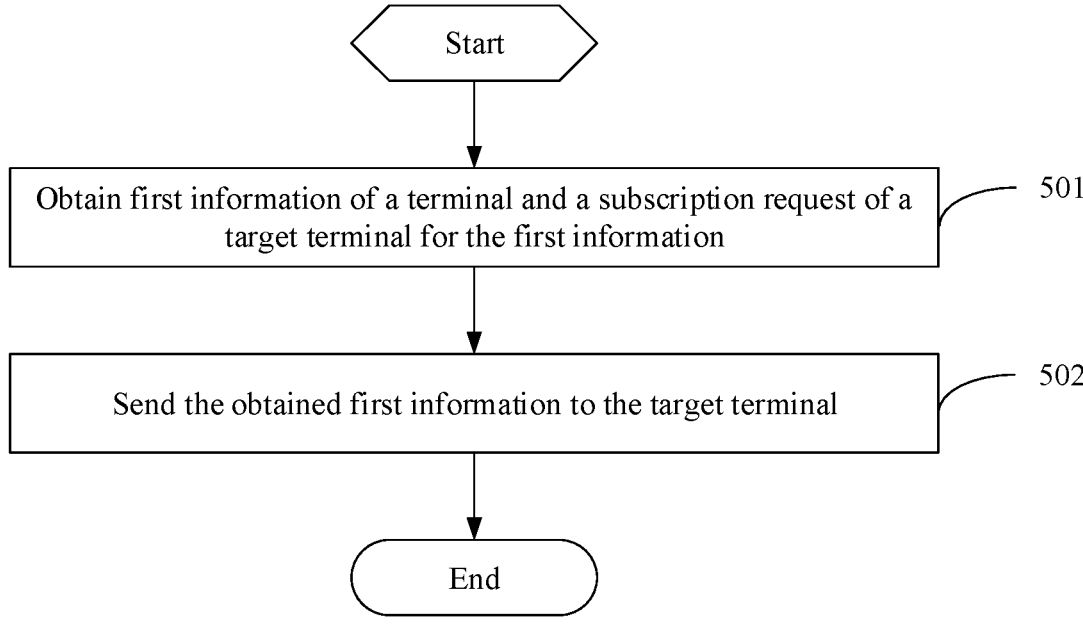
FIG. 5 is a flowchart of another information transmission method according to an embodiment of this application.

Referring to FIG. 5, an embodiment of this application provides another information transmission method, applied to a fourth communications device. In an implementation, the fourth communications device includes a CN network element (such as an AMF), and in another implementation, the fourth communications device includes but is not limited to one of the following: an AF, an EAS, or an ECS. The method includes the following steps.

Step 501: Obtain first information of a terminal and a subscription request of a target terminal for the first information.

Step 502: Send the obtained first information to the target terminal.

The first information is used to indicate one of the following:

that the terminal supports a first capability; and that the terminal does not support the first capability.

In an implementation, the target terminal is a communications device that sends the subscription request, such as an AF, an EAS, or an ECS.

In an implementation, for the first information, reference may be made to the corresponding descriptions of the embodiments shown in FIG. 2 and FIG. 3; and details are not repeated herein.

In this embodiment of this application, the obtained first information is sent to the target terminal, so that the network side can send the second information and/or the third information to the terminal only in the case that the terminal supports the first capability, thereby achieving effects of saving network resources.

The information transmission method provided by the embodiments of this application is described below by using examples with reference to a plurality of embodiments:

Embodiment 1

Figure 6:
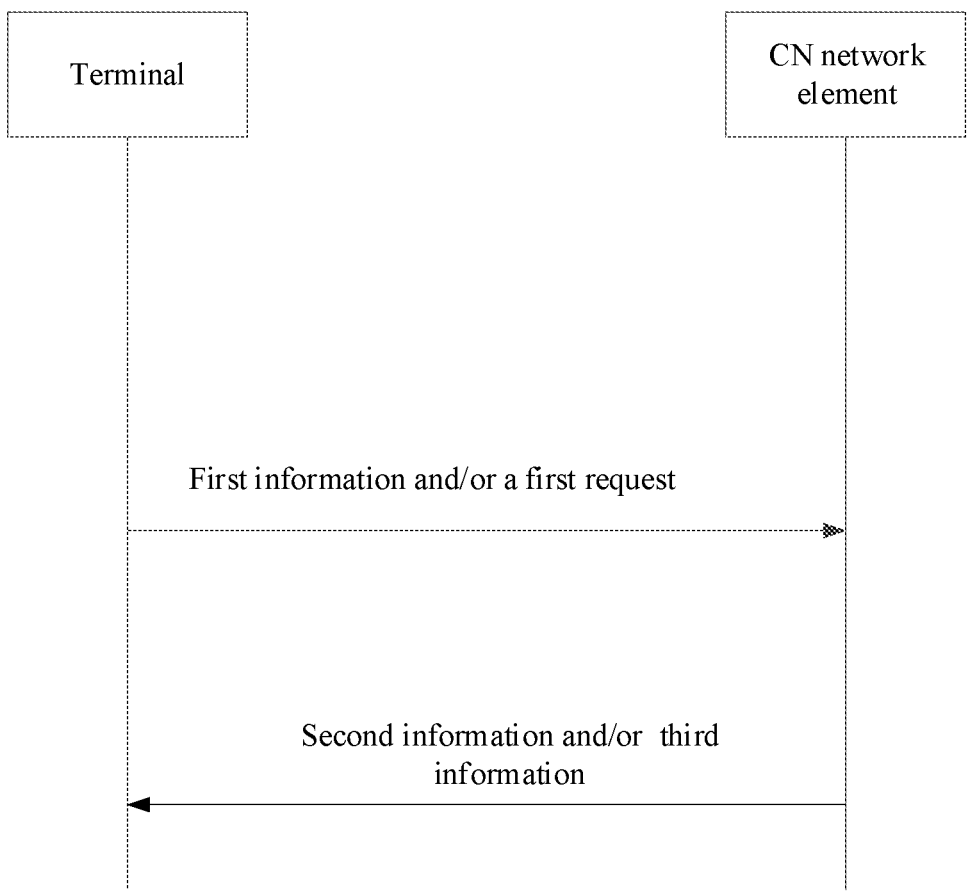
FIG. 6 is a schematic diagram of an information transmission method according to an embodiment of this application.

For this embodiment, refer to FIG. 6. As shown in FIG. 6, the following steps are included.

Step 1: The terminal sends first information and/or a first request to a CN network element.

In an implementation, in a case that the first condition being satisfied is determined, the first request is sent.

The first condition includes at least one of the following:

the terminal has a first capability; and an application is authorized to obtain second information and/or third information.

In an implementation, the first information is used to indicate one of the following:

that the terminal supports the first capability; and that the terminal does not support the first capability; where Step 2: In a case that presence of the first capability on the terminal is determined or the first request is received, the CN network element sends the second information and/or the third information to the terminal.

The second information includes: at least one of EAS information and ECS information.

In a case that absence of the first capability on the terminal is determined or the first request is not received, the CN network element notifies an AF that the terminal does not have the first capability.

Embodiment 2

Figure 7:
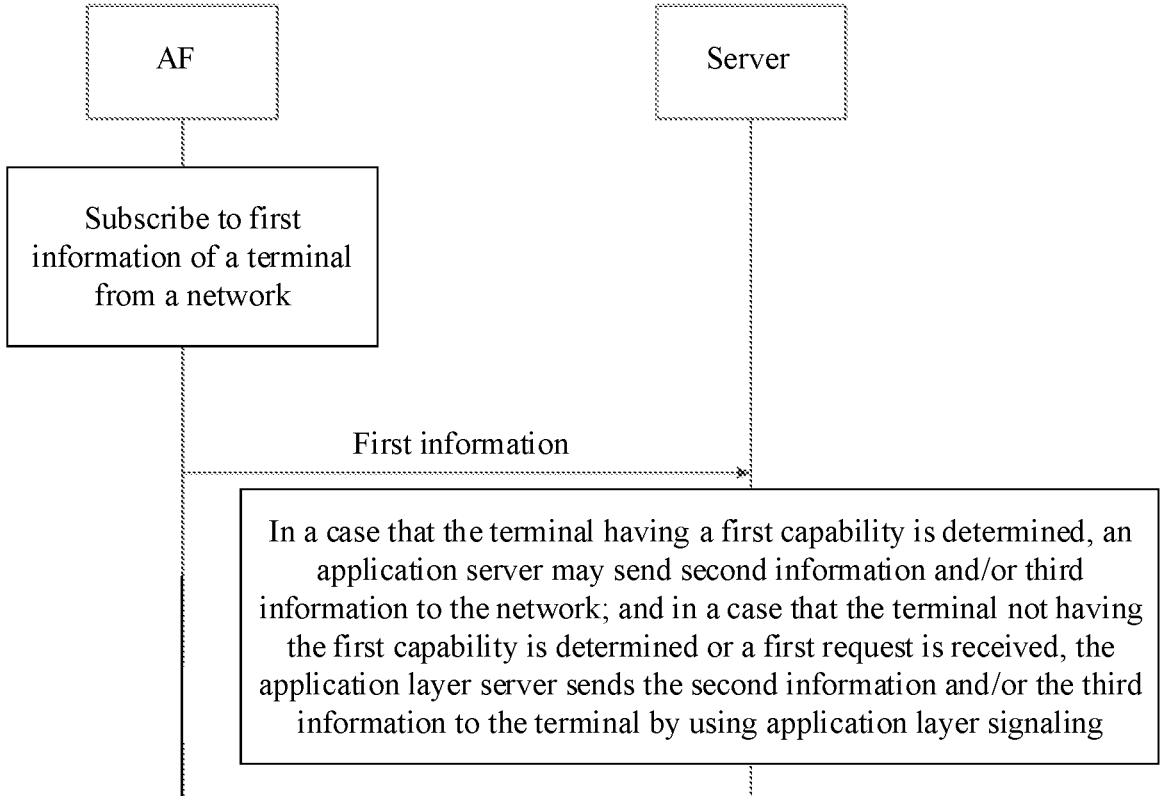
FIG. 7 is a schematic diagram of an information transmission method according to an embodiment of this application.

For this embodiment, refer to FIG. 7. As shown in FIG. 7, the following steps are included.

Step 1: An AF subscribes to first information of the terminal from the network.

Step 2: Obtain the first information of the terminal.

Step 3: In a case that presence of the first capability on the terminal is determined, an application server may send second information and/or third information to the network; and in a case that absence of the first capability on the terminal is determined or a first request is not received, the application layer server sends the second information and/or the third information to the terminal through an application layer.

Figure 8:
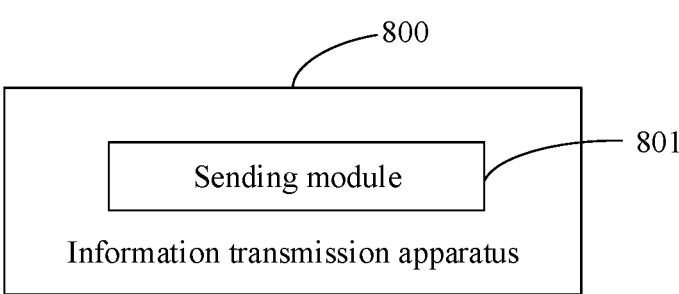
FIG. 8 is a structural diagram of an information transmission apparatus according to an embodiment of this application.

Referring to FIG. 8, FIG. 8 is a structural diagram of an information transmission apparatus according to an embodiment of this application. The apparatus is applied to a first communications device. As shown in FIG. 8, the information transmission apparatus 800 includes:

a sending module 801, configured to send first information and/or a first request, where the first information is used to indicate one of the following:

that a terminal supports a first capability; and that the terminal does not support the first capability.

The first capability includes at least one of the following:

a capability of supporting transmitting second information to an application client of the terminal;

a capability of supporting the application client of the terminal to obtain the second information;

a capability of supporting transmitting third information to the application client of the terminal, where the third information is information obtained by the terminal from control plane signaling of a communications network; and a capability of supporting the application client of the terminal to obtain the third information, where the third information is information obtained by the terminal from the control plane signaling of the communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, the apparatus further includes:

a determining module, configured to determine whether the terminal supports the first capability.

Optionally, the apparatus further includes:

a receiving module, configured to receive the second information and/or the third information.

Optionally, the apparatus further includes:

an execution module, configured to: in a case that the terminal supports the first capability, perform a first operation, where the first operation includes at least one of the following:

receiving the second information and/or the third information; and sending the second information and/or the third information to the application client of the terminal.

Optionally, the EAS information includes at least one of the following: address information of an EAS and domain name information of the EAS; and the ECS information includes at least one of the following: address information of an ECS and domain name information of the ECS.

Optionally, the sending a first request includes: in a case that a first condition is satisfied, sending the first request.

The first condition includes at least one of the following:

the terminal has the first capability; and the application is authorized to obtain the second information and/or the third information.

The information transmission apparatus provided in this embodiment of this application can implement the processes of the method embodiment of FIG. 2. To avoid repetition, details are not repeated herein. This can save network resources.

It should be noted that the information transmission apparatus in this embodiment of this application may be an apparatus, or may be a component, an integrated circuit, or a chip in the first communications device.

Figure 9:
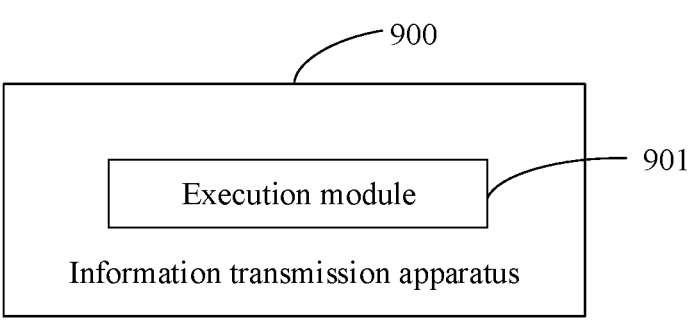
FIG. 9 is a structural diagram of another information transmission apparatus according to an embodiment of this application.

Referring to FIG. 9, FIG. 9 is a structural diagram of an information transmission apparatus according to an embodiment of this application. The apparatus is applied to a second communications device. As shown in FIG. 9, the information transmission apparatus 900 includes:

an execution module 901, configured to perform a second operation, where the second operation includes at least one of the following:

in a case that supporting of a first capability by a terminal is determined and/or a first request is received, sending second information and/or third information;

in a case that non-supporting of the first capability by the terminal is determined and/or the first request is not received, notifying an application server or an application function AF that the terminal does not support the first capability; and in a case that non-supporting of the first capability by the terminal is determined and/or the first request is not received, sending, to the application server or the AF, information used for the application server.

The first capability includes at least one of the following:

a capability of supporting transmitting second information to an application client of the terminal;

a capability of supporting the application client of the terminal to obtain the second information;

a capability of supporting transmitting third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

Optionally, the apparatus further includes:

a receiving module, configured to receive first information, where the first information is used to indicate one of the following:

that the terminal supports the first capability; and that the terminal does not support the first capability.

Optionally, the apparatus further includes:

a determining module, configured to: according to the first information, determine whether the terminal supports the first capability.

Optionally, the EAS information includes at least one of the following: address information of an EAS and domain name information of the EAS; and the ECS information includes at least one of the following: address information of an ECS and domain name information of the ECS.

The information transmission apparatus provided in this embodiment of this application can implement the processes of the method embodiment of FIG. 3. To avoid repetition, details are not repeated herein. This can save network resources.

It should be noted that the information transmission apparatus in this embodiment of this application may be an apparatus, or may be a component, an integrated circuit, or a chip in the second communications device.

Figure 10:
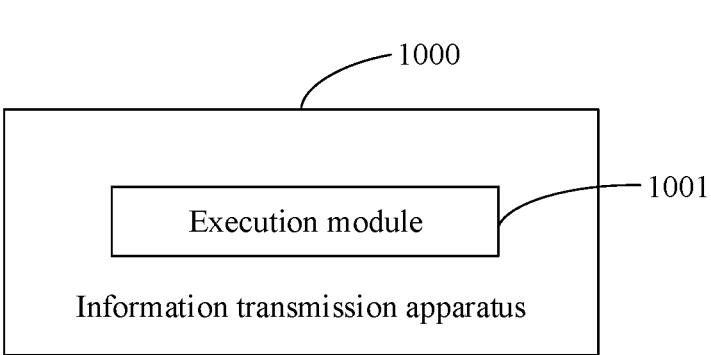
FIG. 10 is a structural diagram of another information transmission apparatus according to an embodiment of this application.

Referring to FIG. 10, FIG. 10 is a structural diagram of an information transmission apparatus according to an embodiment of this application. The apparatus is applied to a third communications device. As shown in FIG. 10, the information transmission apparatus 900 includes:

an execution module 1001, configured to perform a third operation, where the third operation includes at least one of the following:

in a case that supporting of a first capability by a terminal is determined, sending second information and/or third information to a communications network; and in a case that non-supporting of the first capability by the terminal is determined, sending the second information and/or the third information to the terminal through an application layer.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, the apparatus further includes:

a subscribing module, configured to subscribe to first information of the terminal from the communications network, where the first information is used to indicate one of the following:

that the terminal supports the first capability; and that the terminal does not support the first capability.

Optionally, the apparatus further includes:

a determining module, configured to: according to the first information, determine whether the terminal supports the first capability.

The information transmission apparatus provided in this embodiment of this application can implement the processes of the method embodiment of FIG. 4. To avoid repetition, details are not repeated herein. This can save network resources.

It should be noted that the information transmission apparatus in this embodiment of this application may be an apparatus, or may be a component, an integrated circuit, or a chip in the third communications device.

Figure 11:
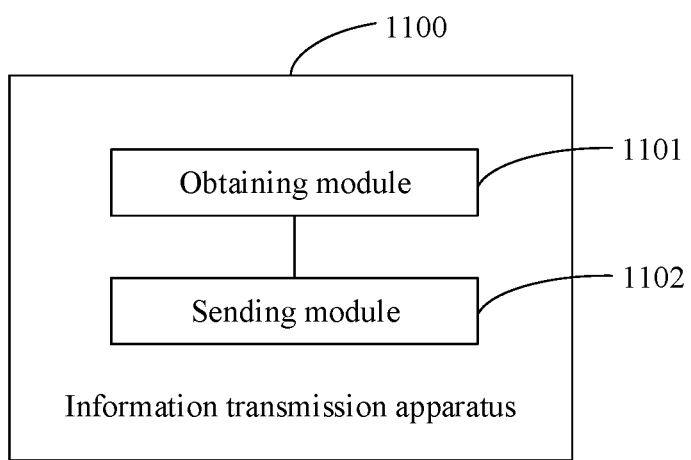
FIG. 11 is a structural diagram of another information transmission apparatus according to an embodiment of this application.

Referring to FIG. 11, FIG. 11 is a structural diagram of an information transmission apparatus according to an embodiment of this application. The apparatus is applied to a fourth communications device. As shown in FIG. 11, the information transmission apparatus 900 includes:

an obtaining module 1101, configured to obtain first information of a terminal and a subscription request of a target terminal for the first information; and a sending module 1102, configured to send the obtained first information to the target terminal.

The first information is used to indicate one of the following:

that the terminal supports a first capability; and that the terminal does not support the first capability.

The information transmission apparatus provided in this embodiment of this application can implement the processes of the method embodiment of FIG. 4. To avoid repetition, details are not repeated herein. This can save network resources.

It should be noted that the information transmission apparatus in this embodiment of this application may be an apparatus, or may be a component, an integrated circuit, or a chip in the fourth communications device.

Figure 12:
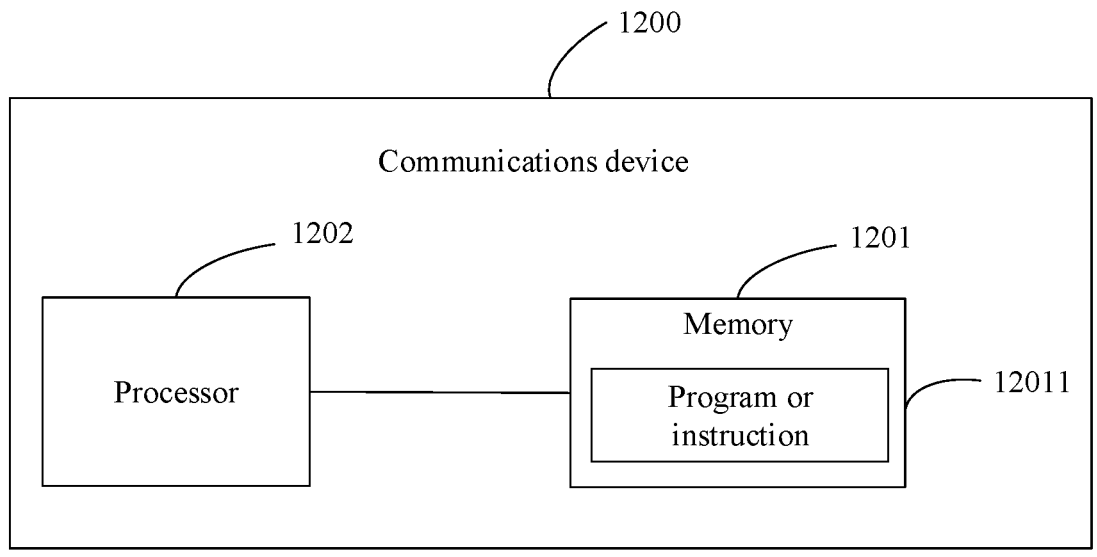
FIG. 12 is a structural diagram of a communications device according to this application.

Referring to FIG. 12, FIG. 12 is a structural diagram of a communications device according to an embodiment of the present invention. As shown in FIG. 12, the communications device 1200 includes a memory 1201, a processor 1202, and a program or instructions 12011 stored on the memory 1201 and capable of running on the processor 1202.

When the communications device 1200 acts as the first communications device in the foregoing method embodiment, the following steps are implemented when the program or instructions 12011 are executed by the processor 1202:

determining that a terminal supports a first capability; and sending first information and/or a first request, where the first information is used to indicate one of the following:

that the terminal supports a first capability; and that the terminal does not support the first capability.

The first capability includes at least one of the following:

a capability of supporting transmitting second information to an application client of the terminal;

a capability of supporting the application client of the terminal to obtain the second information;

a capability of supporting transmitting third information to the application client of the terminal, where the third information is information obtained by the terminal from control plane signaling of a communications network; and a capability of supporting the application client of the terminal to obtain the third information, where the third information is information obtained by the terminal from the control plane signaling of the communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, after the step of sending first information and/or a first request, when the program or instructions 12011 are executed by the processor 1202, the following step is further implemented:

receiving the second information and/or the third information.

Optionally, after the step of sending first information and/or a first request, when the program or instructions 12011 are executed by the processor 1202, the following step is further implemented:

in a case that the terminal supports the first capability, performing a first operation, where the first operation includes at least one of the following:

receiving the second information and/or the third information; and sending the second information and/or the third information to the application client of the terminal.

Optionally, the EAS information includes at least one of the following: address information of an EAS and domain name information of the EAS; and the ECS information includes at least one of the following: address information of an ECS and domain name information of the ECS.

Optionally, the sending a first request includes: in a case that a first condition is satisfied, sending the first request.

The first condition includes at least one of the following:

the terminal has the first capability; and the application is authorized to obtain the second information and/or the third information.

When the communications device 1200 acts as the second communications device in the foregoing method embodiment, the following step is implemented when the program or instructions 12011 are executed by the processor 1202:

performing a second operation, where the second operation includes at least one of the following:

in a case that supporting of a first capability by a terminal is determined and/or a first request is received, sending second information and/or third information;

in a case that non-supporting of the first capability by the terminal is determined and/or the first request is not received, notifying an application server or an application function AF that the terminal does not support the first capability; and in a case that non-supporting of the first capability by the terminal is determined and/or the first request is not received, sending, to the application server or the AF, information used for the application server.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

The first request is used to indicate at least one of the following:

requesting the second information; and requesting information used for the application client.

Optionally, before the step of performing a second operation, the following step is further implemented when the program or instructions 12011 are executed by the processor 1202:

receiving first information, where the first information is used to indicate one of the following:

that the terminal supports the first capability; and that the terminal does not support the first capability.

Optionally, the following step is further implemented when the program or instructions 12011 are executed by the processor 1202:

determining, according to the first information, whether the terminal supports the first capability.

Optionally, the EAS information includes at least one of the following: address information of an EAS and domain name information of the EAS; and the ECS information includes at least one of the following: address information of an ECS and domain name information of the ECS.

When the communications device 1200 acts as the third communications device in the foregoing method embodiment, the following step is implemented when the program or instructions 12011 are executed by the processor 1202:

performing a third operation, where the third operation includes at least one of the following:

in a case that supporting of a first capability by a terminal is determined, sending second information and/or third information to a communications network; and in a case that non-supporting of the first capability by the terminal is determined, sending the second information and/or the third information to the terminal through an application layer.

The first capability includes at least one of the following:

a capability of supporting transmitting the second information to an application client of the terminal;

a capability of supporting the application client of the terminal to obtain the second information;

a capability of supporting transmitting the third information to the application client of the terminal; and a capability of supporting the application client of the terminal to obtain the third information.

The third information is information obtained by the terminal from control plane signaling of a communications network.

The second information includes at least one of the following:

edge application server EAS information;

edge configuration server ECS information;

quality of service QoS monitoring report or QoS change report; and information used for an application server, where the information used for the application server needs to be forwarded to the application server through the application client.

Optionally, the information obtained by the terminal from the control plane signaling of the communications network includes:

EAS information;

ECS information;

QoS monitoring report or QoS change report; and information used for an application server, where the information used for the application server needs to be forwarded to the application server through the application client.

Optionally, before the step of performing a third operation, the following step is further implemented when the program or instructions 12011 are executed by the processor 1202:

subscribing to first information of the terminal from the communications network, where the first information is used to indicate one of the following:

that the terminal supports the first capability; and that the terminal does not support the first capability.

Optionally, the following step is further implemented when the program or instructions 12011 are executed by the processor 1202:

determining, according to the first information, whether the terminal supports the first capability.

When the communications device 1200 acts as the fourth communications device in the foregoing method embodiment, the following steps are implemented when the program or instructions 12011 are executed by the processor 1202:

obtaining first information of a terminal and a subscription request of a target terminal for the first information; and sending the obtained first information to the target terminal.

The first information is used to indicate one of the following:

that the terminal supports a first capability; and that the terminal does not support the first capability.

According to the communications device, network resources can be saved.

The communications device 1200 is capable of implementing the processes implemented by the communications device in the foregoing method embodiments. To avoid repetition, details are not described herein again.

An embodiment of this application further provides a readable storage medium, where a program or instructions are stored in the readable storage medium. When the program or the instructions are executed by a processor, the processes of the foregoing embodiment of the information transmission method can be implemented, with the same technical effects achieved. To avoid repetition, details are not described herein again.

The processor is a processor in the terminal or the network device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the information transmission method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information transmission method, performed by a first communications device, the first communications device comprises a terminal and comprising:

sending first information to a second communications device, wherein the first information is used to indicate one of the following:

that the terminal supports a first capability; or that the terminal does not support the first capability; wherein the first capability comprises at least one of the following:

a capability to transmit second information to an application client of the terminal; or a capability to obtain the second information by the application client of the terminal;

the second information comprises at least one of the following:

edge application server (EAS) information; or edge configuration server (ECS) information.

2. The method according to claim 1, wherein the application client comprises at least one of an edge enabler client (EEC) or an edge application client (EAC).

3. The method according to claim 1, wherein the second information is information obtained by the terminal from control plane signaling of the communications network.

4. The method according to claim 3, wherein the control plane signaling includes a non-access stratum (NAS) signaling.

5. The method according to claim 1, wherein the application client includes an edge enabler client (EEC).

6. The method according to claim 1, wherein after the step of sending first information, the method further comprises receiving the second information.

7. The method according to claim 1, wherein after the step of sending first information, the method further comprises:

in a case that the terminal supports the first capability, performing a first operation, wherein the first operation comprises at least one of the following:

receiving the second information; or sending the second information to the application client of the terminal.

8. The method according to claim 1, wherein:

the EAS information comprises at least one of the following: address information of an EAS or domain name information of the EAS; and the ECS information comprises at least one of the following: address information of an ECS or domain name information of the ECS.

9. The method according to claim 1, the method further comprises:

sending a first request to a second communications device; wherein the first request is used to indicate at least one of the following:

requesting the second information; or requesting information used for the application client;

wherein the sending a first request comprises: in a case that a first condition is satisfied, sending the first request, wherein the first condition comprises at least one of the following:

the terminal has the first capability; or the application is authorized to obtain the second information and/or the third information.

10. An information transmission method, performed by a second communications device and comprising:

receiving first information from the first communications device, wherein the first information is used to indicate one of the following:

that the terminal supports the first capability, or that the terminal does not support the first capability;

performing a second operation, wherein the second operation comprises at least one of the following:

in a case that it's determined that the terminal supports the first capability, sending second information to the terminal;

in a case that it's determined that the terminal does not support the first capability, notifying an application server or an application function (AF) that the terminal does not support the first capability; and in a case that it's determined that the terminal does not support the first capability, sending, to the application server or the AF, information used for the application server; wherein the first capability comprises at least one of the following:

a capability to transmit the second information to an application client of the terminal; or a capability to obtain the second information by the application client of the terminal;

the second information comprises at least one of the following:

edge application server (EAS) information; or edge configuration server (ECS) information.

11. The method according to claim 10, wherein the application client comprises at least one of an edge enabler client (EEC), or an edge application client (EAC).

12. The method according to claim 10, wherein the second information is information obtained by the terminal from control plane signaling of the communications network.

13. The method according to claim 12, wherein the control plane signaling includes a non-access stratum (NAS) signaling.

14. The method according to claim 10, wherein the method further comprises determining, according to the first information, whether the terminal supports the first capability.

15. The method according to claim 10, wherein the EAS information comprises at least one of the following: address information of an EAS or domain name information of the EAS; and the ECS information comprises at least one of the following: address information of an ECS or domain name information of the ECS.

16. An information transmission method, performed by a third communications device and comprising:

performing a third operation, wherein the third operation comprises at least one of the following:

in a case that it's determined that the terminal supports the first capability, sending second information to the terminal; and in a case that it's determined that the terminal does not support the first capability, sending the second information to the terminal through an application layer, wherein the first capability comprises at least one of the following:

a capability to transmit the second information to an application client of the terminal; or a capability to obtain the second information by the application client of the terminal;

the second information comprises at least one of the following:

edge application server (EAS) information; or edge configuration server (ECS) information.

17. The method according to claim 16, wherein the second information is information obtained by the terminal from control plane signaling of the communications network.

18. The method according to claim 16, wherein before the step of performing a third operation, the method further comprises:

subscribing to first information of the terminal from the communications network, wherein the first information is used to indicate one of the following:

that the terminal supports the first capability; and that the terminal does not support the first capability.

19. The method according to claim 18, wherein the method further comprises:

determining, according to the first information, whether the terminal supports the first capability.

20. The method according to claim 16, wherein the application client comprises at least one of an edge enabler client (EEC) or an edge application client (EAC).

* * * * *